Sept. 12, 1967 R. D. RUMSEY 3,341,189
HYDRAULIC BUFFER

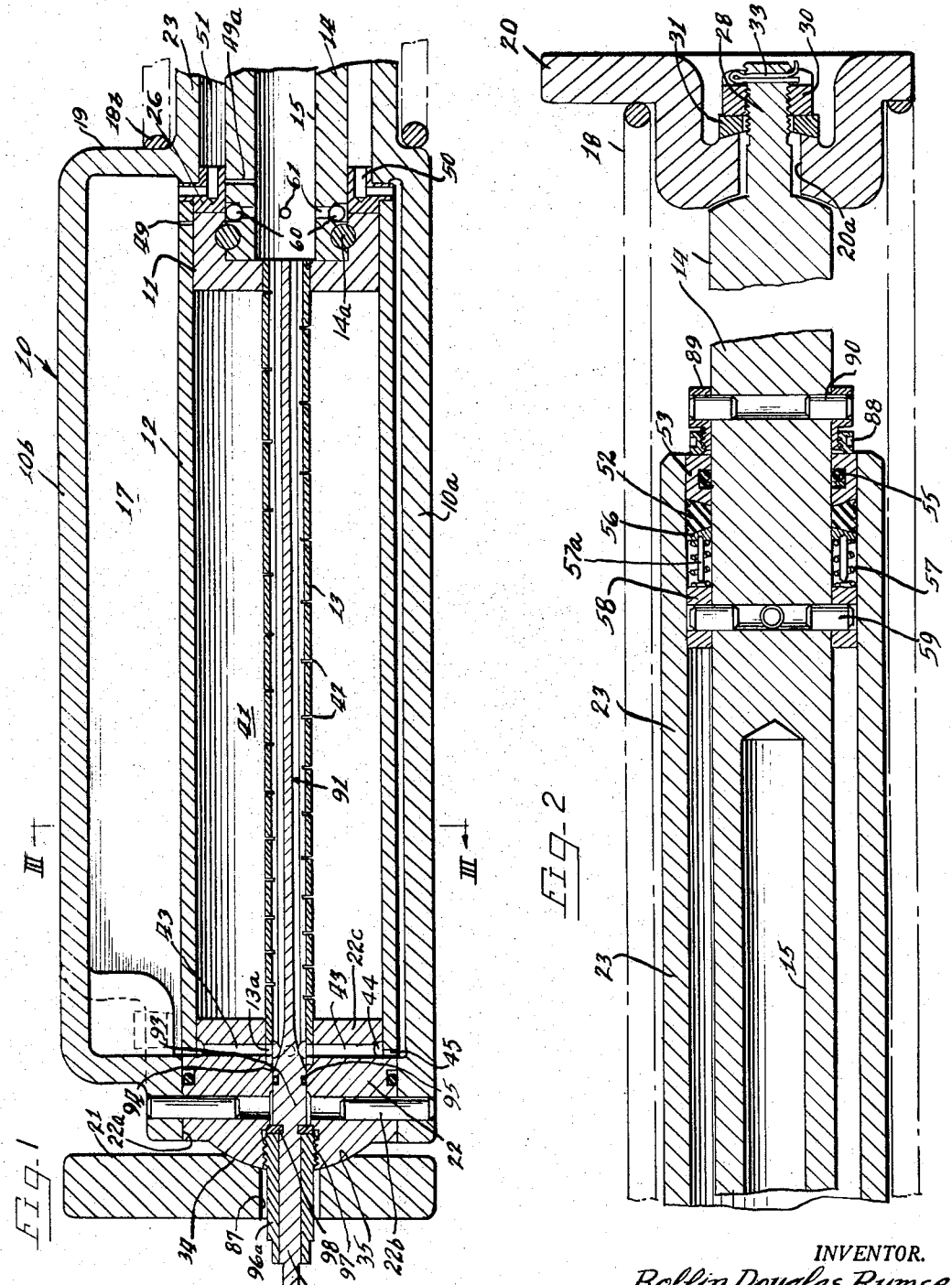

Original Filed Dec. 8, 1961 2 Sheets-Sheet 2

INVENTOR.
Rollin Douglas Rumsey
BY
Hill, Sherman, Meroni, Gross & Simpson
ATTORNEYS United States Patent Office 3,341,189
Patented Sept. 12, 1967

3,341,189
HYDRAULIC BUFFER
Rollin Douglas Rumsey, Buffalo, N.Y., assignor to Houdaille Industries, Inc., Buffalo, N.Y., a corporation of Michigan
Original application Dec. 8, 1961, Ser. No. 157,981, now Patent No. 3,190,630, dated June 22, 1965. Divided and this application Apr. 12, 1965, Ser. No. 463,978
13 Claims. (Cl. 267—1)

This application is a division of Ser. No. 157,981, filed Dec. 8, 1961, now Patent No. 3,190,630, granted June 22, 1965.

The invention relates to hydraulic shock absorbing buffers, and more particularly it concerns a hydraulic shock absorbing buffer capable of absorbing high loads under adverse environmental conditions.

For uses such as exemplified by radar antenna buffers, railway car buffers, and the like, the shock absorbing devices must survive sometimes long periods of inactivity and still provide reliable operation. During such inactive periods, the buffer can become virtually smothered in paint or dirt. In these and other practical uses, exemplary of which are buffers in aircraft, missiles, and the like, extremely high capacity in proportion to size is a criterion, since weight and space are often at a premium. Reliability in the field for this type of hydraulic shock absorbing buffers has been difficult to achieve, and this has created a particular hazard in situations where preventive maintenance could not or was not supplied.

It is, accordingly, an important object of the present invention to provide a hydraulic shock absorbing buffer construction which will effectively overcome the foregoing and other problems and meet various design objectives resulting from the difficulties indicated.

Another object of the invention is to provide a new and improved hydraulic shock absorbing buffer structure capable of longer life and higher loads than previously available devices, even under adverse environmental conditions.

A further object of the invention is to provide a new and improved hydraulic buffer of the character described embodying a highly advantageous eccentric disposition of the cylinder in the reservoir to have minimum reserve of fluid at the bottom of the reservoir and for effective gravity replenishment having the liquid level above the highest part of the cylinder.

Yet another object of the invention is to provide a new and improved buffer construction embodying an improved metering device.

A still further object of the invention is to provide a new and improved buffer assembly in which a novel metering tube is provided having saw cuts or slots.

It is also an object of the invention to provide a new and improved hydraulic buffer having novel adjustable orifice control means whereby to afford selective shifting of the damping orifice schedule.

Yet an additional object of the invention is to provide new and improved buffer construction of the character described embodying a novel bearing and seal construction in which the seal is adapted to be placed under adjustable compression.

Other objects, features and advantages of the present invention will be readily apparent from the following detailed description of a preferred embodiment thereof, taken in conjunction with the accompanying drawings, in which:

FIGURE 1 is a fragmentary longitudinal sectional elevational detail view through the working cylinder and piston portion of one embodiment of the invention;

FIGURE 2 is a fragmental longitudinal sectional elevational detail view of the remaining portion of the same embodiment.

Figure 3:
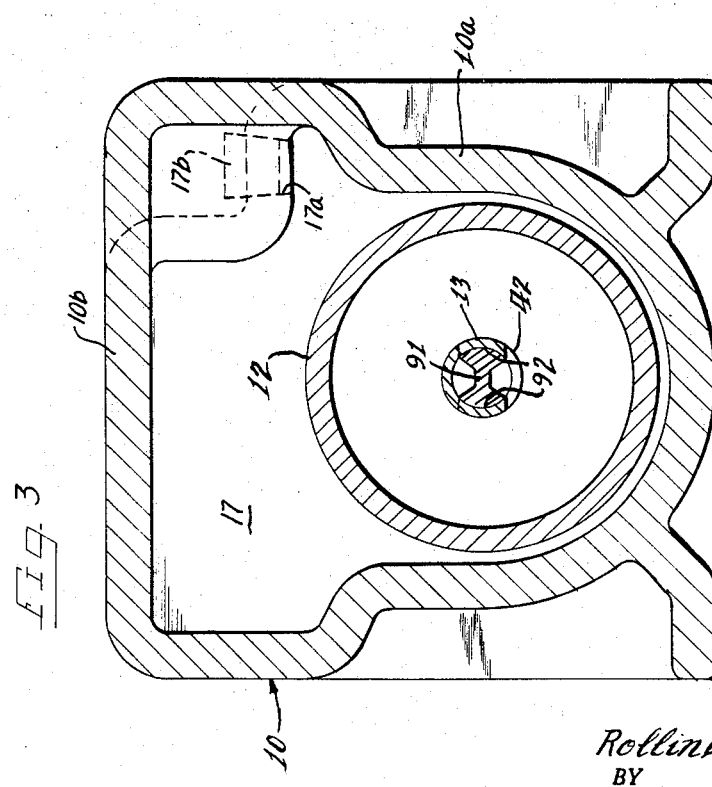
FIGURE 3 is an enlarged fragmentary transverse sectional detail view taken substantially on the line III—III of FIGURE 1.

A hydraulic shock absorbing buffer as depicted is constructed and arranged for use in a substantially horizontal position and to provide for a substantial range of shock absorbing travel of the active components. To this end, the buffer includes an elongated main body or housing 10 within which a piston 11 is longitudinally slidably operable in a tubular working cylinder 12. A metering tube 13 is mounted concentrically in the cylinder and the piston is slidably engaged with the metering tube.

Extending rearwardly from the piston 11 is a piston rod 14 secured to the piston by means such as one or more dowels 14a. Centrally, the piston rod 14 has a longitudinal bore 15 which receives the metering tube 13 in fully telescoped relationship of the piston and the metering tube.

About the cylinder 12, the housing 10 provides a reservoir 17 throughout the length of which the cylinder extends and within which the cylinder is so thoroughly enclosed as to preclude contamination by dirt or other foreign matter externally of the buffer unit. Further, the cylinder is thoroughly protected against damage from external forces and is thoroughly supported against working load stresses by the rugged housing. Within the reservoir 17 a filled hydraulic system is maintained, suitable hydraulic fluid such as substantially non-viscous oil being supplied to maintain the cylinder full from the reservoir.

As best seen in FIGURES 1 and 3, the reservoir space within the housing 10 is afforded by a lower longitudinal housing portion 10a providing a reservoir-defining inner wall of substantially semicylindrical cross-section shape disposed in relatively closely spaced concentric relation to the cylinder 12, whereby in the lower portion of the reservoir space necessary fluid fill is reduced to a minimum, and there is an advantageous saving in vertical space in the buffer structure. The upper portion of the reservoir space is accommodated within a substantial upward and sideward enlargement 10b of the housing. This affords ample heat expansion room for the hydraulic fluid as well as storage room for replenishing fluid. Normally the reservoir 17 is filled with the hydraulic fluid to a working level corresponding to at least the upper surface of the working cylinder 12, and with the cylinder filled with oil. A supply of the hydraulic fluid or oil is adapted to be introduced into the reservoir through a suitable filling opening 17a in the upper enlarged housing portion 10b and closed by a suitable plug 17b.

Normally the piston 11 is maintained in an extended position in the cylinder 12, adjacent to the rear end of the cylinder, by biasing means comprising a coil spring 18 concentric with the cylinder and which thrusts at its forward end against a rearwardly facing shoulder 19 on the housing 10, and at its rear end thrusts against a follower flange 20 mounted on the rear end portion of the piston rod 14. This follower flange is adapted to engage one member or structure having relative approaching movement to another member or structure with which the buffer is adapted to be employed and against which other member or structure a front end follower 21 of the buffer unit engages. The front end follower 21 is mounted in free swivelling relation on a front end head 22 serving as a closure for a head end bore 22a of a diameter to permit assembly of the cylinder 12 into the housing. Retaining means such as dowel pins 22b secure the head member in place. At its inner end the head member 22 has a reduced diameter circular boss portion 22c fitting retainingly into the front end portion of the cylinder 12.

Extending rearwardly from the housing 10, and in this instance integrally in one piece therewith, is a cylinder extension 23 of substantial length concentric with and surrounding the piston rod 14 in spaced relation. At the inner end of this cylinder extension 23, a closing ring 26 is mounted and serves as means for concentrically securing the rear end of the cylinder 12.

Binding and bending of the buffer unit is obviated by the free swivelling connection of the followers 20 and 21. Means for securing the follower 20 in free swivelling connection to the outer end portion of the piston rod 14 comprise an axially rearwardly extending integral stud 28 on the piston rod extending through a bore 20a through the follower 20 and of larger diameter than the stud. A castellated or slotted head nut 30 is threaded on to the rearwardly projecting end portion of the stud 28 and bears against the thrust washer 31 which has a complementary concave front face configuration complementary to a convex bearing formation of the follower 20 about the bore 20a. A cotter pin 33 retains the nut 30 against backing off or tightening from an adjusted position.

For swivelling bearing interengagement, the head 22 has a convex bearing surface 34 and the follower 21 has a complementary concave thrust surface 35 engaging the follower surface.

During inward working strokes of the piston 11, it moves progressively into a cylindrical concentric working chamber 41 of the cylinder 12 and progressively slidably moves inwardly along the metering tube 13 whereby to effect progressive covering of two series of orifices 42 along the length of the metering tube, with the respective series staggered with relation to one another and progressively diminishing in spacing from the rear end of the metering tube toward the head end thereof, substantially as shown in FIGURE 1. From the head end of the metering tube hydraulic fluid displaced from the working chamber 41 in the inward working stroke of the piston passes through ports 13a into radial passages 43 in the supporting head boss 22c, and from an annular peripheral groove 44 in the boss out through a fluid metering gap 45 between the end of the cylinder 12 and the head 22 into the reservoir 17. During return stroke of the piston, of course, the flow of hydraulic fluid is reversed.

This hydraulic buffer is a two-way damper, high level damping being effective during the inward stroke of the piston 11 and a low level damping being effected during the return stroke of the piston. During the inward or closing stroke of the piston, hydraulic fluid displaced into the blind end piston rod bore 15 from the metering tube 13 passes check valves 60 in radial passages 61 into the area in back of the piston and forwardly of the closure ring 26, not only preventing a vacuum condition from developing but filling the area behind the piston with hydraulic fluid. During return stroke movement of the piston, the check valve 60 prevents return of the fluid into the piston rod bore 15 and the return force exerted as by the biasing spring 18, causes the fluid from the area back of the piston to meter through at least one orifice 49 through the cylinder 12 adjacent to the closure ring 26. During the major portion of return travel of the piston 11 the fluid back of the piston is also metered through at least one orifice 49a extending through the wall of the piston rod 14 spaced rearwardly a limited distance from the passages 61 and adapted to be closed by the closure ring 26 as the piston approaches the closure ring, whereby to affect deceleration of the piston. Such deceleration is in two stages, the first being experienced as the port or orifice 49a is closed and the second stage being reached when the port or orfice 49 is closed by the piston in the final increment of return movement. Thereby the piston is prevented from mechanically striking the closure ring 26 with any damaging force during the return damping movement.

Hydraulic fluid displacement is effected through passages 50 in the closure ring between the reservoir 17 and an annular chamber 51 defined between the piston rod 14 and the protective and guiding cylinder extension 23.

Advantageous economy in construction, minimizing machining, and more particularly fine, close tolerance machining of working surfaces, is attained by use of the cylinder extension 23 which is of a length that extends about the same distance from the rear end of the cylinder 12 as the length of travel of the piston 11 in the cylinder. The only surface of the cylinder tube 12 requiring close tolerance finishing is the inner cylindrical surface defining the chamber 41, which may be honed for close sliding fit of a complementary highly finished cylindrical surface of the piston 11.

Furthermore, by having the piston rod 14 provided with bearing and sealing means which engage the longitudinal cylindrical inner wall of the extension 23 substantially adjacent the rear extremity of the cylinder extension and the fully extended position of the buffer, protection against entry of dirt and other contaminants into the buffer is afforded. This is also advantageous in reducing machining because through this arrangement the piston rod 14 requires no special machining and may be made from relatively inexpensive materials. The sealing and bearing means comprise a sealing ring 52 which is desirable of generally trapezoidal cross-section having its widest face bearing against the inner surface of the cylinder extension 23 and its narrow inner face opposing the piston rod 14. At its outer side, the sealing ring 52 has the complementary side surface of a retainer ring 53 thrusting thereagainst and equipped with sealing ring means 55 seated in its inner periphery and sealingly engaging the piston rod perimeter. Thrusting against the front side of the sealing ring 52 is a complementary retaining ring 56 against which wear take-up spring means 57 thrust, being held in position by internal guide rods 57a. At the forward ends the spring 57 thrusts against a ring bearing 58 held in place by means such as dowel pins 59. It will be observed that through this arrangement an efficient bearing arrangement is afforded, with the piston 11 serving as a bearing on one end of the piston rod 14 and the ring bearing 58 serving as a bearing toward the opposite end of the piston rod 14 and more particularly on that portion of the piston rod which remains enclosed within the rear end portion of the extension 23 in the fully extended relation of the piston and piston rod.

Whereas the take-up springs 57 comprise dynamic wear compensating means, opposing means are provided for effecting adjustment in the take-up pressure and then serving as static back-up means. Means for this purpose comprise an internally threaded adjustment ring nut 88 thrusting against the outer end of the rigid retainer ring 53 and threadedly engaging an externally threaded ferrule element or member 89 engaged about the piston rod 14 and secured thereto as by means of dowel pins 90. For this arrangement, assembly of the bearing and sealing structure on the rod is adapted to be effected by first mounting the bearing ring 58, then successively mounting the spring 57 and the back-up or retainer ring 56, the sealing ring 52, the retainer ring 53, and finally mounting and securing in place the ferrule 89 carrying the adjustment ring nut 88 which is then tightened up to attain the amount of squeeze on the bearing ring 52 which will afford the desired sealing pressure of the sealing ring against the inner cylindrical surface of the extension shoulder 23 for efficient operation.

According to the present invention, extremely effective metering action is produced during the down stroke or inward working stroke which accommodates high loads, without undue stresses of any of the parts and with good flow characteristics throughout. Substantial advantage is attained by enabling an adjustable damping schedule to be provided in order that reductions in mass can be accommodated without increasing the $g$ force excessively. To attain optimum results, the respective orifice slots 42 occupy less than 90° of the tube inside circumference and the slots are preferably spaced parabolically, according to the square law, and are alternated on opposite sides of the metering tube in order to maintain hydraulic balance as closely as possible and thereby to prevent the development of excessive side loads such as might tend to induce excessive wear in the piston 11 and also possible binding due to bending.

Also in accordance with the invention, a butterfly cross-section rotary plug valve 91 is inserted in the tube 13 so that arcuate sides 92 thereof, as seen in FIGURE 3, closely fit the bore of the metering tube. The valve 91 may have an outer end portion 93 snugly journaled in a bore 94 in the head 22 and sealed therein by an O-ring 95, or the like. Preferably the butterfly cross-section portion of the valve 91 extends for the full length of the tube 13, and the outer portion 93 has a reduced extension 96 extending through the bore 87 in the follower 21 and is fitted with a sleeve 96a threadedly engaging an enlarged portion of the bore 94 at 97. The sleeve 96a may be set in abutting relation to an annular washer or the like 98 seated in a recess in the extension 96 as shown.

Thus the valve 91 may be selectively rotated from outside of the buffer so that the surfaces 92 thereof effect a decrease or an increase in the total dimension of the slots 42, as desired, to accommodate increases or reductions in mass, relatively, to meet particular conditions.

It will be understood that modifications and variations may be effected without departing from the scope of the novel concepts of the present invention.

I claim as my invention:

1. A hydraulic buffer adapted to be connected between a pair of relatively movable members and comprising:
    a cylinder,
    a cylinder head for said cylinder,
    a metering tube fixedly secured in said head in concentric relation in the cylinder,
    a piston in said cylinder slidably and snugly engaging the metering tube,
    means urging said piston outwardly of said cylinder, and a rotary metering valve extending into said metering tube,
    said metering tube defining a plurality of axially spaced, transversely enlarged slots and said rotary metering valve having a surface snugly engaging a fractional extent of the inner diameter of the metering tube,
    said rotary metering valve being rotatable to selectively adjust the extent of opening of said slots,
    a reservoir surrounding said cylinder,
    said head having conduit means communicating between the metering tube and the reservoir whereby the metering tube meters fluid from the cylinder to the reservoir and an area in back of the piston during closing action of the piston, and
    means metering fluid from said area in back of the piston to said reservoir during return action of the piston to provide a two-way damping action, said damping action on closing being proportionate to the extent of opening of said slots.

2. A hydraulic buffer adapted to be connected between a pair of relatively movable members and comprising:
    a cylinder,
    a cylinder head for said cylinder,
    a metering tube fixedly secured in said head in concentric relation in the cylinder,
    a piston in said cylinder slidably and snugly engaging the metering tube,
    a piston rod on said piston extending outwardly of the cylinder,
    a cylinder portion mounted in axially fixed relation to the cylinder and in radially spaced relation to the piston rod,
    sealing means on the piston rod in sealing relation to the cylinder portion,
    a closing ring between the cylinder and the space between the cylinder portion and the piston rod,
    said closing ring defining a passage between the reservoir and said space and said piston rod having an axial bore in communication with said metering tube and closed at one end further away from said metering tube, and check valve means in the position affording communication between the bore and an area between the piston and the closing ring during closing action of the piston and preventing transmission of fluid from the area to the bore during return action of the piston,
    means urging said piston outwardly of said cylinder, and a rotary metering valve extending into said metering tube,
    said metering tube defining a plurality of axially spaced, transversely enlarged slots and said rotary metering valve having a surface snugly engaging a fractional extent of the inner diameter of the metering tube,
    said rotary metering valve being rotatable to selectively adjust the extent of opening of said slots, and a reservoir surrounding said cylinder,
    said head having conduit means communicating between the metering tube and the reservoir whereby the metering tube meters fluid from the cylinder to the reservoir and to said area during closing action of the piston, and at least one orifice in the cylinder metering fluid from the area to the reservoir during return action of the piston to provide a two-way damping action proportionate to the extent of opening of said slots, and
    means returning fluid from the reservoir to the cylinder during return action of the piston.

3. A hydraulic buffer adapted to be connected between a pair of relatively movable members and comprising:
    a cylinder,
    a cylinder head for said cylinder,
    a metering tube fixedly secured in said head in concentric relation in the cylinder,
    a piston in said cylinder slidably and snugly engaging the metering tube,
    a piston rod on said piston extending outwardly of the cylinder,
    a cylinder portion mounted in axially fixed relation to the cylinder and in radially spaced relation to the piston rod,
    sealing means on the piston rod in sealing relation to the cylinder portion,
    a closing ring between the cylinder and the space between the cylinder portion and the piston rod,
    said closing ring having a passage between the reservoir and said space and said piston rod having an axial bore in communication with said metering tube and closed at one end further away from said metering tube, and check valve means in the piston affording communication between the bore and an area between the piston and the closing ring during closing action of the piston and preventing transmission of fluid from the area to the bore during return action of the piston,
    means urging said piston outwardly of said cylinder, and a rotary metering valve extending into said metering tube,
    said metering tube defining a plurality of spaced, transversely enlarged slots and said rotary metering valve having a pair of opposed surfaces snugly engaging a fractional extent of the inner diameter of the metering tube,
    said slots being alternately disposed on opposite sides of the tube to prevent stress imbalances on the metering tube,
    said rotary metering valve being rotatable to selectively adjust the extent of opening of said slots, and a reservoir surrounding said cylinder,
    said head having conduit means communicating between the metering tube and the reservoir and the cylinder having an orifice between the area and the reservoir whereby the metering tube meters fluid from the cylinder to the reservoir during closing to provide a damping action proportionate to the extent of opening of said slots.

4. A hydraulic buffer adapted to be connected between a pair of relatively movable members and wherein the buffer is normally in an extended condition ready for compression stroke resistance to movement of the movable members toward one another and comprising, a working cylinder, means at one end of the working cylinder for thrusting opposition to one of the movable members, a piston in said working cylinder and having a piston rod projecting to a substantial extent beyond the working cylinder and having means on its outer end to thrustingly oppose the other of the movable members, means normally biasing the piston rod relative to the working cylinder to maintain an extended relationship of the piston rod and to maintain the piston in the end of the working cylinder nearest the piston rod, means defining a shoulder to stop the piston within the working cylinder in the fully extended position of the piston rod, an extension from the cylinder beyond said shoulder means and concentrically surrounding the piston rod, the piston rod projecting beyond the distal end of said extension a sufficient distance to permit full inward compression thrust movement of the piston while the outer end portion of the piston rod remains free from the extension, the inner surface of the extension providing a cylindrical surface, annular bearing means and fluid sealing means on the piston rod located to engage said cylindrical surface adjacent to the distal end of the extension in the fully extended position of the piston rod and thereby sealing said cylindrical surface against entry of dirt or contaminants, the length of said cylindrical surface beyond said shoulder means being related to the full stroke range of the piston in the working cylinder to permit full range of working stroke of the piston, said cylindrical surface being of a limited larger diameter than the diameter of the piston rod, said bearing means comprising a ring-shaped member, a retainer member spaced axially from the ring-shaped bearing member, said bearing member and said retainer member being held in fixed axial relation, said sealing means comprising a trapezoidal sealing ring having its widest portion opposing the cylindrical surface, and means between the bearing ring and the sealing ring effecting expanding thrust against the sealing ring to maintain it in continuously firm sealing engagement with the cylindrical surface.

5. A hydraulic buffer adapted to be disposed between opposed movable members to resist movement of the members toward one another and the buffer comprising:

a cylinder, a piston in the cylinder and having a piston rod of substantially smaller diameter extending outwardly beyond one end of the cylinder, means defining a housing about the cylinder and providing a reservoir, means effecting communication between the reservoir and the cylinder, a tubular cylindrical extension projecting from the housing adjacent to and concentric with said one end of the cylinder and in surrounding relation to the piston rod but shorter than the piston rod so that the outer end portion of the piston rod projects therebeyond for opposition to one of said movable members, bearing and sealing means on the piston rod slidingly engaging said extension, a metering tube secured in concentric relation at the opposite end of said cylinder and extending through the cylinder and into and through the piston and concentrically into a bore extending longitudinally in the piston rod, means on the metering tube for metering displacement of fluid between the cylinder and said reservoir in reciprocations of the piston in the cylinder, and means associated with the metering tube for adjusting the metering rate through the metering tube.

6. A hydraulic buffer as defined in claim 5, in which said means for effecting communication including a longitudinal space series of transverse saw cuts in the wall of the metering tube and said adjusting means comprises a butterfly valve extending longitudinally within the metering tube.

7. A hydraulic buffer as defined in claim 5, including means for adjusting said butterfly valve from a position outside of the buffer.

8. A hydraulic buffer adapted to be disposed between a pair of relatively movable members to resist movement of the members toward one another and said buffer comprising:

a cylinder, a piston in said cylinder and having a piston rod of substantially smaller diameter extending outwardly beyond one end of the cylinder, means comprising a closure associated with said one end of the cylinder and slidably engaging the piston rod back of the piston, metering means in said cylinder and comprising an elongated metering member extending longitudinally through the cylinder and through the piston, said piston rod having a longitudinal bore receptive of said metering member on inward stroking movement of the piston, a passage communicating said bore with the area back of the piston and having a check valve therein enabling displacement of hydraulic fluid from said bore into said area back of the piston during inward movements of the piston and blocking return flow of the fluid through said passage, and a displacement metering orifice extending through the wall of the piston rod rearwardly from the piston and metering the fluid from back of the piston into said bore for return stroke damping.

9. A hydraulic buffer adapted to be disposed between a pair of relatively movable members to resist movement of the members toward one another and said buffer comprising:

a cylinder, a piston in said cylinder and having a piston rod of substantially smaller diameter extending outwardly beyond one end of the cylinder, means comprising a closure associated with said one end of the cylinder and slidably engaging the piston rod back of the piston, metering means in said cylinder and comprising an elongated metering member extending longitudinally through the cylinder and through the piston, said piston rod having a longitudinal bore receptive of said metering member on inward stroking movement of the piston, a passage communicating said bore with the area back of the piston and having a check valve therein enabling displacement of hydraulic fluid from said bore into said area back of the piston during inward movements of the piston and blocking return flow of the fluid through said passage, a displacement metering orifice extending through the wall of the piston rod rearwardly from the piston and metering the fluid from back of the piston into said bore for return stroke damping, and means for blocking said metering orifice near the end of the return stroke of the piston.

10. A hydraulic buffer adapted to be disposed between a pair of relatively movable members to resist movement of the members toward one another and said buffer comprising:
- a cylinder,
- a position in said cylinder and having a piston rod of substantially smaller diameter extending outwardly beyond one end of the cylinder,
- means comprising a closure associated with said one end of the cylinder and slidably engaging the piston rod back of the piston,
- metering means in said cylinder and comprising an elongated metering member extending longitudinally through the cylinder and through the piston,
- said piston rod having a longitudinal bore receptive of said metering member on inward stroking movement of the piston,
- a passage communicating said bore with the area back of the piston and having a check valve therein enabling displacement of hydraulic fluid from said bore into said area back of the piston during inward movements of the piston and blocking return flow of the fluid through said passage,
- a metering orifice in the wall of said cylinder adjacent to said one end communicating with the reservoir, and a metering orifice extending through the wall of said piston rod rearwardly from the piston and communicating the area back of the piston with the bore in the piston rod,
- said metering orifices effecting return stroke damping displacement of hydraulic fluid from said area back of the piston during outward movements of the piston.

11. A hydraulic buffer adapted to be connected between two relatively movable members,
- an elongated tubular cylinder initially open at both opposite ends,
- a housing surrounding said cylinder and defining a chamber providing a fluid reservoir substantially coextensively surrounding the cylinder and having an initial opening adjacent one end of the cylinder,
- a head structure rigid with the housing at the opposite end of said reservoir chamber and retainingly engaging with the opposite end of said cylinder,
- means retainingly engaging with said one end of the cylinder and closing said reservoir opening,
- fluid displacement and replenishment passage means effecting communication between said cylinder and the reservoir,
- a working piston reciprocable in said cylinder, and a piston rod projecting from the piston beyond said one end of the cylinder and said cylinder-end-engaging and reservoir closing means, said reservoir chamber having an enlarged reservoir portion elevated above the cylinder in a horizontal position of the buffer for gravity replenishing of the cylinder through said passage means, the lower portion of the chamber generally conforming to the lower side of the cylinder in relatively closely spaced relation, whereby the close spacing about the lower side of the cylinder reduces to a minimum the necessary fluid fill but said enlarged elevated portion of the reservoir affords ample heat expansion room for the hydraulic fluid and reservoir space for replenishing fluid for the cylinder.

12. A hydraulic buffer as defined in claim 11, wherein said lower portion of the chamber is of semicylindrical shape conforming to the shape of the cylinder, and said elevated portion of the reservoir chamber is wider than the cylinder.

13. A hydraulic buffer as defined in claim 11, including means on that portion of the housing defining the enlarged portion of the reservoir chamber for filling the reservoir chamber.

No references cited.

ARTHUR L. LA POINT, *Primary Examiner.*

D. E. HOFFMAN, *Assistant Examiner.*